(12) United States Patent
Pelletier

(10) Patent No.: US 6,484,667 B2
(45) Date of Patent: Nov. 26, 2002

(54) METHOD AND APPARATUS FOR SECURING A BOTTLE TO A PET CAGE

(75) Inventor: Darcy Pelletier, Box 513, Legal, Alberta (CA), T0G 1L0

(73) Assignees: Daniel Lawrence Orchard, Edmonton (CA); Darcy Pelletier, Legal (CA)

( * ) Notice: Subject to any disclaimer, the term of this patent is extended or adjusted under 35 U.S.C. 154(b) by 0 days.

(21) Appl. No.: 09/867,099

(22) Filed: May 29, 2001

(65) Prior Publication Data

US 2001/0047767 A1 Dec. 6, 2001

(30) Foreign Application Priority Data

May 30, 2000 (CA) ............................................. 2310164

(51) Int. Cl.⁷ ................................................ A01K 7/00
(52) U.S. Cl. ........................................ 119/72.5; 119/72
(58) Field of Search .......................... 119/72, 72.5, 475, 119/51.5

(56) References Cited

U.S. PATENT DOCUMENTS

| 3,167,287 | A | * | 1/1965 | Collins, Jr. ................. 211/106 |
| 3,529,575 | A | * | 9/1970 | Schalik ....................... 119/475 |
| 3,589,338 | A | * | 6/1971 | Lovitz ...................... 119/51.01 |
| 4,543,912 | A | * | 10/1985 | Steudler, Jr. ................ 119/475 |
| 4,807,567 | A | | 2/1989 | Atchley ....................... 119/18 |
| 5,301,634 | A | | 4/1994 | Ho ............................. 119/18 |
| 5,363,802 | A | | 11/1994 | Huff ........................... 119/18 |
| 5,669,329 | A | | 9/1997 | Krause ....................... 119/72.5 |

* cited by examiner

Primary Examiner—Charles T. Jordan
Assistant Examiner—Judith A. Nelson
(74) Attorney, Agent, or Firm—Davis & Bujold, P.L.L.C.

(57) ABSTRACT

An apparatus for securing a bottle to a pet cage is which includes a spring and a bottle. The spring has a first pair of arms and a second pair of arms protruding outwardly from a pair of spaced loops. The first pair of arms has a first connecting member extending inbetween to defined a first bottle receiving space. The second pair of arms has a second connecting member extending inbetween to defined a second bottle receiving space. The bottle is adapted to fit within and extend between the first bottle receiving space and the second bottle receiving space. The biasing force of the spring forces the bottle securely against the bars.

6 Claims, 6 Drawing Sheets

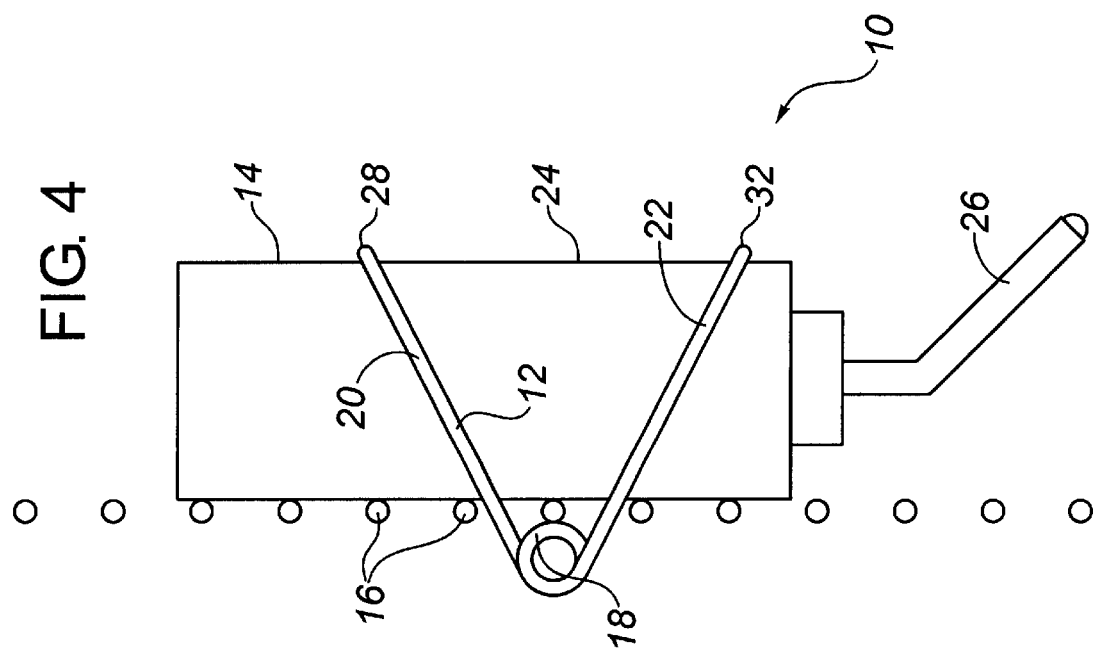
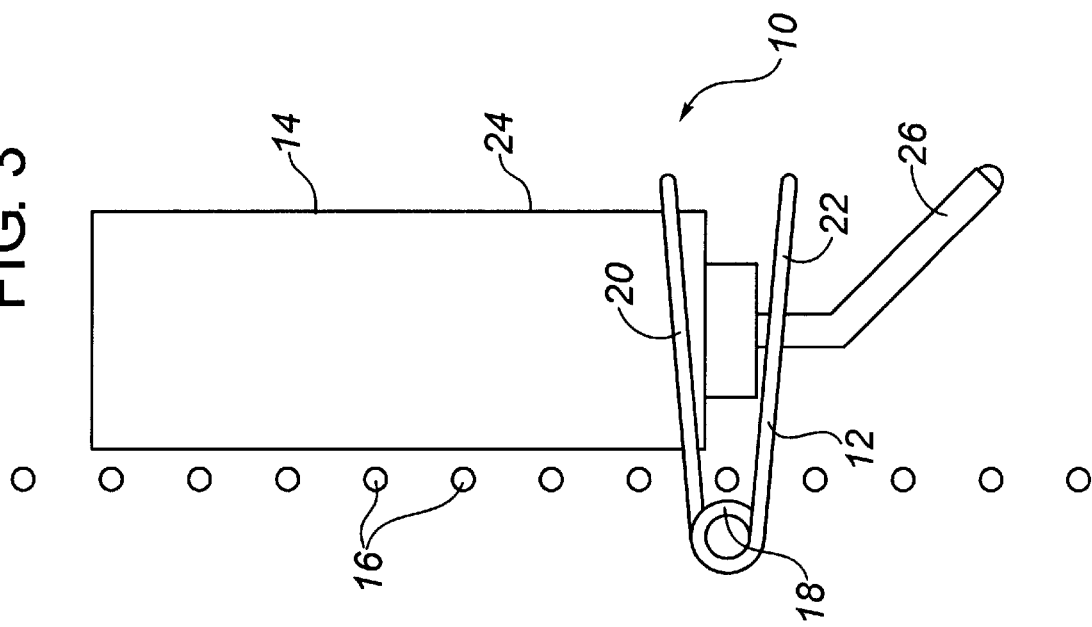

METHOD AND APPARATUS FOR SECURING A BOTTLE TO A PET CAGE

FIELD OF THE INVENTION

The present invention relates to a method and an apparatus for securing a bottle to a pet cage

BACKGROUND OF THE INVENTION

When caring for an animal, provision must be made for the animal to receive sufficient water. With small animals, such as hamsters, a water bottle is generally mounted onto the animal's cage.

The most common apparatus for mounting a water bottle onto a cage consists of a single cinch wire. As the water in the bottle becomes depleted, the weight of the bottle decreases. Eventually, the weight of the bottle decreases to the point that the animal, in the course of taking a drink, is able to lift the bottle and dislodge it from the cinch wire. When this occurs the animal is without a supply of water, until someone notices that the bottle has been knocked out of position.

There has long been recognized a need for a better method and apparatus for securing a water bottle to a pet cage. A number of such apparatus have been patented, such as U.S. Pat. No. 4,807,567 (Atchley), U.S. Pat. No. 5,363,802 (Huff), and U.S. Pat. No. 5,669,329 (Krause). Each of these apparatus discloses a special water bottle with a compatible support bracket. These apparatus have not gained popular appeal, due in part to the price at which they must be sold in order to recover the costs associated with the special water bottle and bracket.

SUMMARY OF THE INVENTION

What is required is an alternative method and apparatus for securing a bottle to a pet cage; preferably one that does not require a special bottle.

According to one aspect of the present invention there is provided an apparatus for securing a bottle to a pet cage. The apparatus is in the form of a kit which includes a spring and a bottle. The spring consists of a pair of loops with a first pair of spaced outwardly protruding arms and a second pair of outwardly protruding arms. The first pair of arms have a first connecting member extending inbetween. The first pair of arms and the first connecting member define a first bottle receiving space. The second pair of arms have a second connecting member extending inbetween. The second pair of arms and the second connecting member defining a second bottle receiving space. The bottle is adapted to fit within and extend between the first bottle receiving space and the second bottle receiving space.

According to another aspect of the present invention there is provided a method for securing a bottle to a pet cage. The first step involves providing a spring and bottle, as described above. A second step involves inserting the first pair and the second pair of arms of the spring between bars of the pet cage so that the loops are positioned on one side of the bars and the first pair and the second pair of arms is positioned on an opposite side of the bars. A third step involves inserting a bottle into the first bottle receiving space and the second bottle receiving space and permitting the biasing force of the spring acting upon the first connecting member and the second connecting member to force the bottle securely against the bars.

The method and apparatus, as described above, provide an effective and yet cost effective method of securing a bottle. The bottle need not be of any particular shape or configuration. The bottle must of a size that fits within and extends between the first bottle receiving space and the second bottle receiving space. The bottle must not be so large that it restricts the operation of the spring. The springs are currently manufactured and used for other purposes. As such, the springs can be purchased at a reasonable cost.

Although beneficial results may be obtained through the use of the method and apparatus, as described above, even more beneficial results may be obtained when each of the first connecting member and the second connecting member have projecting gripping portions. This facilitates the spring being manually compressed to allow the bottle to be inserted or removed.

Although beneficial results may be obtained through the use of the method and apparatus, as described above, where the bars of the pet cage are closely spaced an attachment rod is used to facilitate the positioning of the spring by insertion of the attachment rod axially through a central passage of each of the loops of the spring.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein:

FIG. 3 is a side elevation view, in section, of the apparatus illustrated in FIG. 1 with the bottle being inserted into the compressed spring.

FIG. 4 is a side elevation view, in section, of the apparatus illustrated in FIG. 1 with the bottle being mounted inside of the cage.

DETAILED DESCRIPTION OF THE PREFERRED EMBODIMENT

Figure 1:
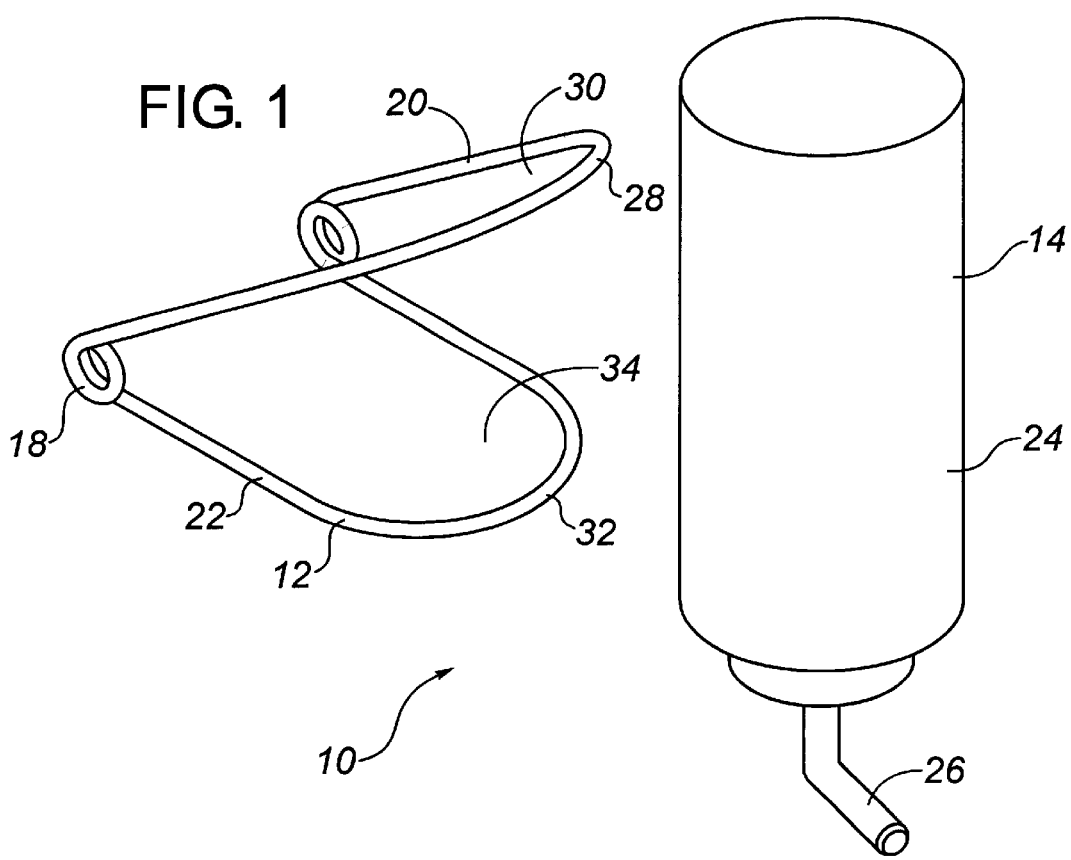
FIG. 1 is a perspective view of an apparatus for securing a bottle to a pet cage in construction in accordance with the teachings of the present method.

The preferred embodiment, an apparatus for securing a bottle to a pet cage in the form of a kit generally identified by reference numeral 10, will now be described with reference to FIGS. 1 though 5.

Structure and Relationship of Parts

Referring to FIG. 1, there is provided an apparatus 10 for securing a bottle to a pet cage in the form of a kit that includes a spring 12 and a bottle 14. Bottle 14 has a body 24 adapted to contain fluids and a drinking duct 26 through which an animal obtains fluids. Spring 12 consists of a pair of loops 18 with a first pair of spaced outwardly protruding arms 20 and a second pair of spaced outwardly protruding arms 22. First pair of arms 20 have a first connecting member 28 extending inbetween. First pair of arms 20 and first connecting member 28 define a first bottle receiving space 30. Second pair of spaced outwardly protruding arms 22 have a second connecting member 32 extending inbetween. Second pair of arms 22 and second connecting member 32 define a second bottle receiving space 34.

Figure 2:
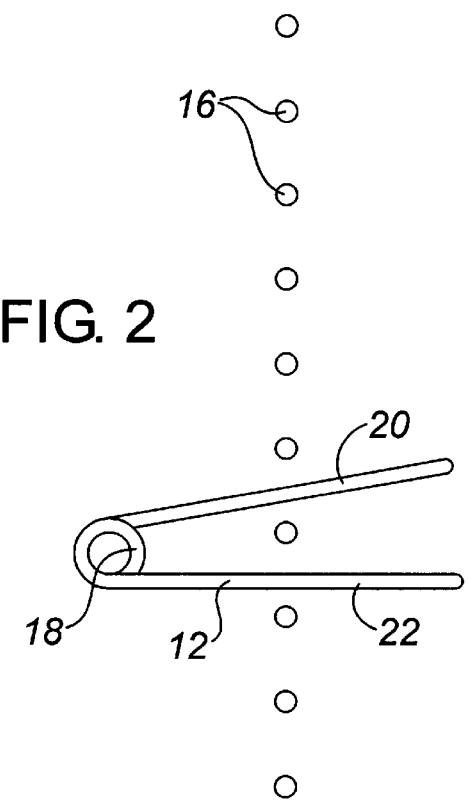
FIG. 2 is a side elevation view, in section, of the apparatus illustrated in FIG. 1 with the spring being compressed and inserted through the bars of a pet cage.

Referring to FIG. 2, pet cage has a plurality of bars 16 through which spring 12 is inserted so as to secure bottle 14 to pet cage. Referring to FIGS. 1 and 4, bottle 14 is adapted to fit within and extend between first bottle receiving space 30 and second bottle receiving space 34.

Operation

Figure 5:
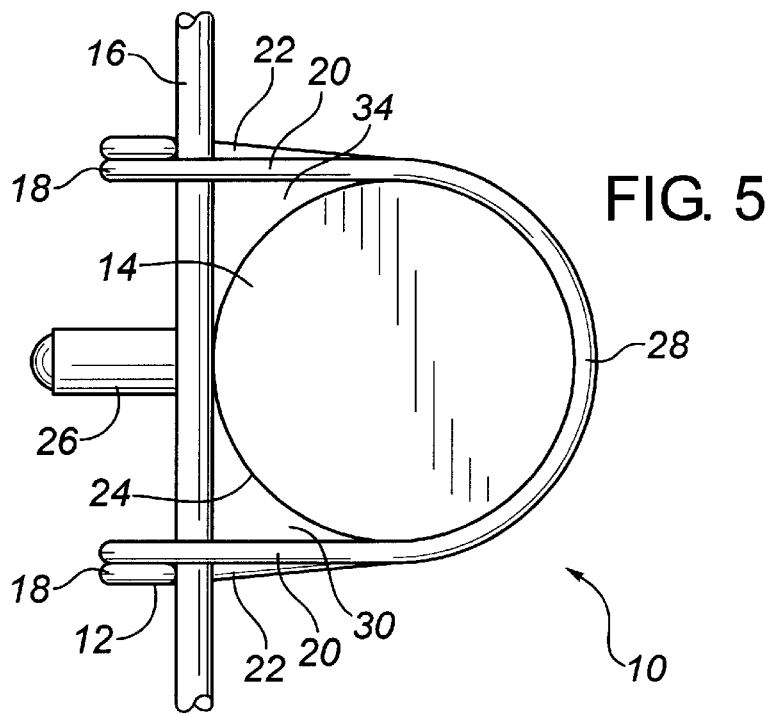
FIG. 5 is top plan view of the apparatus illustrated in FIG. 4.

A method for securing a bottle to a pet cage with apparatus 10 will now be described with reference to FIGS. 1 through 5. Referring to FIG. 1, the first step involves providing spring 12 and bottle 14. The second step involves compressing spring 12 and inserting first pair of arms 20 and second pair of arms 22 of spring 12 between bars 16 of a pet cage so that loops 18 are positioned on one side of bars 16 and first pair of arms 20 and second pair of arms 22 are positioned on an opposite side of bars 16 as illustrated in FIG. 2. A third step involves inserting bottle 14 into first receiving space 30 while spring is compressed as illustrated in FIG. 3. Bottle 14 is then inserted into second receiving space 34. When spring 12 is released, the biasing force of spring 12 acts upon first connecting member 28 and second connecting member 32 to force bottle 14 securely against bars 16 as illustrated in FIG. 4. It will be noted that bottle 14 need not be of a special shape or configuration, so long as it is sized so as to fit within and extend between first bottle receiving space 30 and second bottle receiving space 34 as illustrated in FIGS. 4 and 5. The bottle must not be so large that it restricts the operation of the spring.

Variations and Alternative Embodiments

Figure 6:
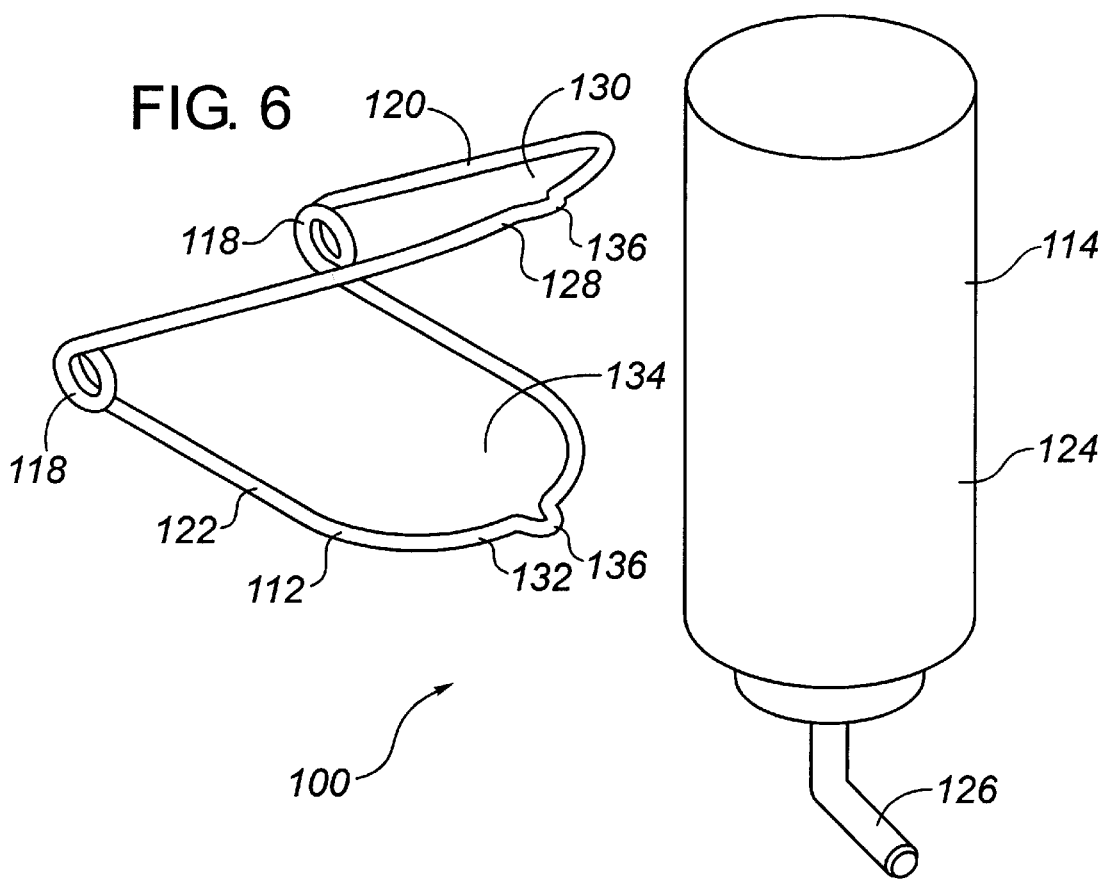
FIG. 6 is a perspective view, in section, of an alternative embodiment of apparatus for securing a bottle to a pet cage having projecting gripping portions.

By using the method described above, apparatus can be secured to position bottle so that both body and drinking duct on the inside of an animal cage as shown in FIG. 4. The same method may be used to secure body of bottle to the outside of cage as illustrated in FIG. 6. The body of bottle is positioned so that drinking duct extends through bars and into cage.

Figure 7:
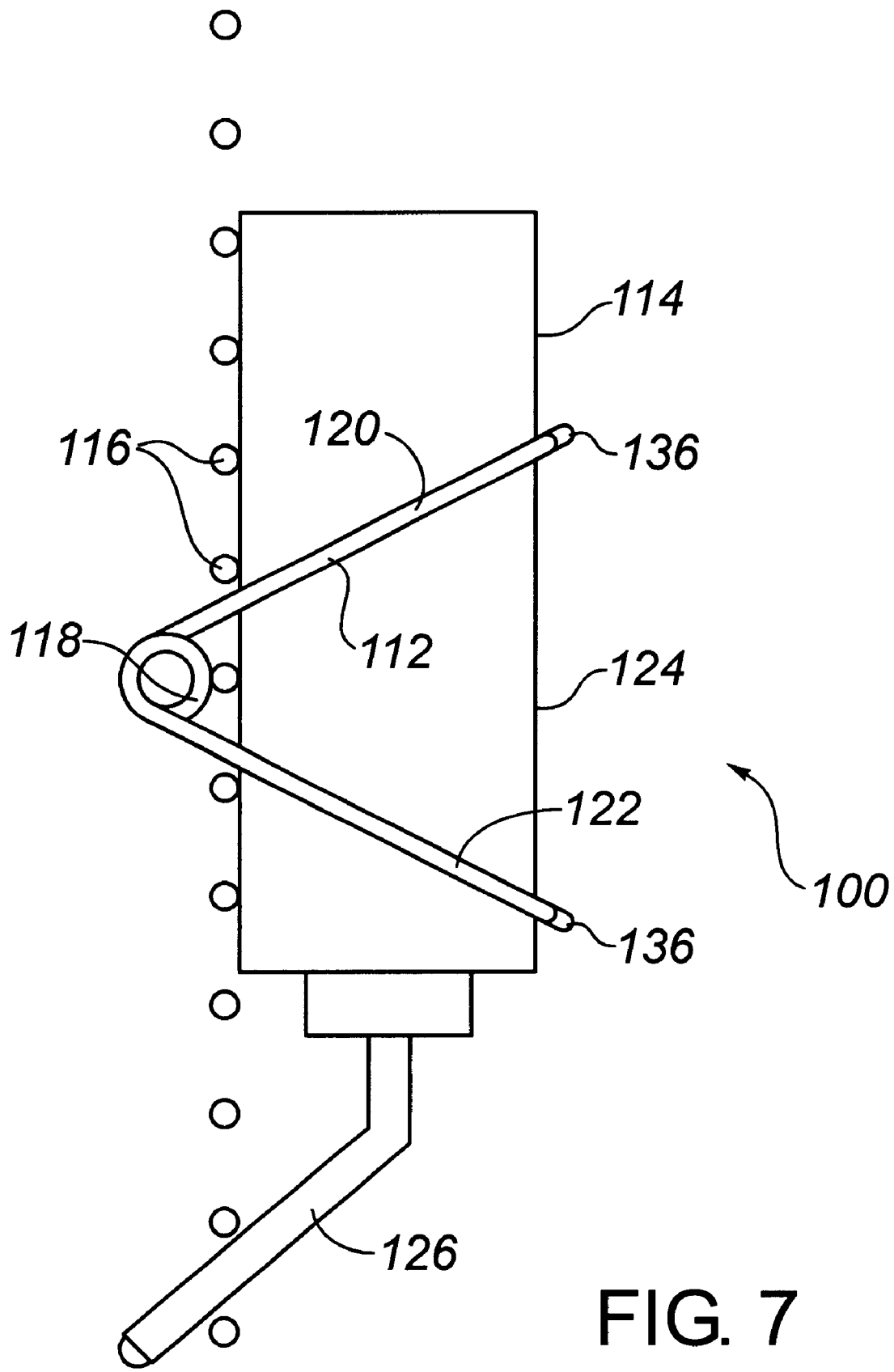
FIG. 7 is a side elevation view, in section, of the apparatus illustrated in FIG. 6, with the bottle being mounted on the exterior of the cage.
Figure 8:
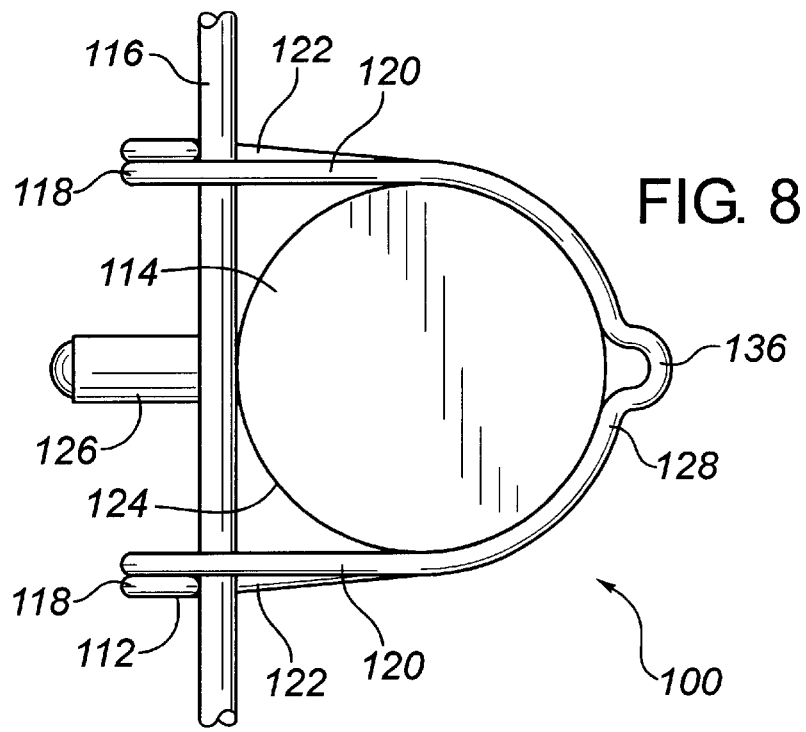
FIG. 8 is top plan view of the alternative embodiment of apparatus illustrated in FIG. 6.

Referring to FIGS. 6 through 8, there is illustrated a second embodiment of an apparatus for securing a bottle to a pet cage generally indicated by reference numeral 100. Referring to FIG. 6, there is provided an apparatus 100 for securing a bottle to a pet cage in the form of a kit that includes a spring 112 and a bottle 114. Spring 112 consists of a pair of loops 118 with a first pair of spaced outwardly protruding arms 120 and a second pair of spaced outwardly protruding arms 122. Bottle 114 has a body 124 adapted to contain fluids and a drinking duct 126 through which an animal obtains fluids. Referring to FIG. 7, spring 112 is inserted between bars 116 of pet cage so as to secure bottle 114 to a pet cage. Referring to FIG. 6, first pair of arms 120 have a first connecting member 128 extending inbetween. First pair of arms 120 and first connecting member 128 of spring 112 define a first bottle receiving space 130. Second pair of spaced outwardly protruding arms 122 have a second connecting member 132 extending inbetween. Second pair of arms 122 and second connecting member 132 define a second bottle receiving space 134. Apparatus 100 is substantially the same as apparatus 10 except that first connecting member 128 and second connecting member 132 have projecting gripping portions 136 as illustrated in FIG. 6 and 8. Gripping portions 136 facilitate manually compression of spring 112 so as to allow bottle 114 to be inserted through first bottle receiving space 130 and second bottle receiving space 134. Bottle 114 is adapted to fit within and extend between first bottle receiving space 130 and second bottle receiving space 134 as illustrated in FIGS. 7 and 8.

Use and operation of apparatus 100 is substantially the same as for apparatus 10. The method of use of apparatus 100 will now be described with reference to FIGS. 6 through 8. Referring to FIG. 6, the first step involves providing spring 112 and bottle 114. The second step involves inserting first pair of arms 120 and second pair of arms 122 of spring 112 between bars 116 of a pet cage so that loops 118 are positioned on one side of bars 116 and first pair of arms 120 and second pair of arms 122 are positioned on an opposite side of bars 116 as illustrated in FIG. 7. A third step involves inserting bottle 114 into first receiving space 130. This is facilitated by using projecting gripping portions 136 illustrated in FIG. 6 to manually compress spring 112. When spring 112 is compressed, bottle 114 is inserted into first bottle receiving space 130 and second bottle receiving space 134. After bottle 114 is properly inserted, projecting gripping portions 136 are released so that spring 112 expands and the biasing force of spring 112 acts upon first connecting member 128 and second connecting member 132 to force bottle 114 securely against bars 116 as illustrated in FIG. 7. It will be noted that as with apparatus 10, bottle 114 need not be of a special configuration, so long as it is sized to fit within and extend between first bottle receiving space 130 and second bottle receiving space 134 as illustrated in FIGS. 7 and 8.

Figure 9:
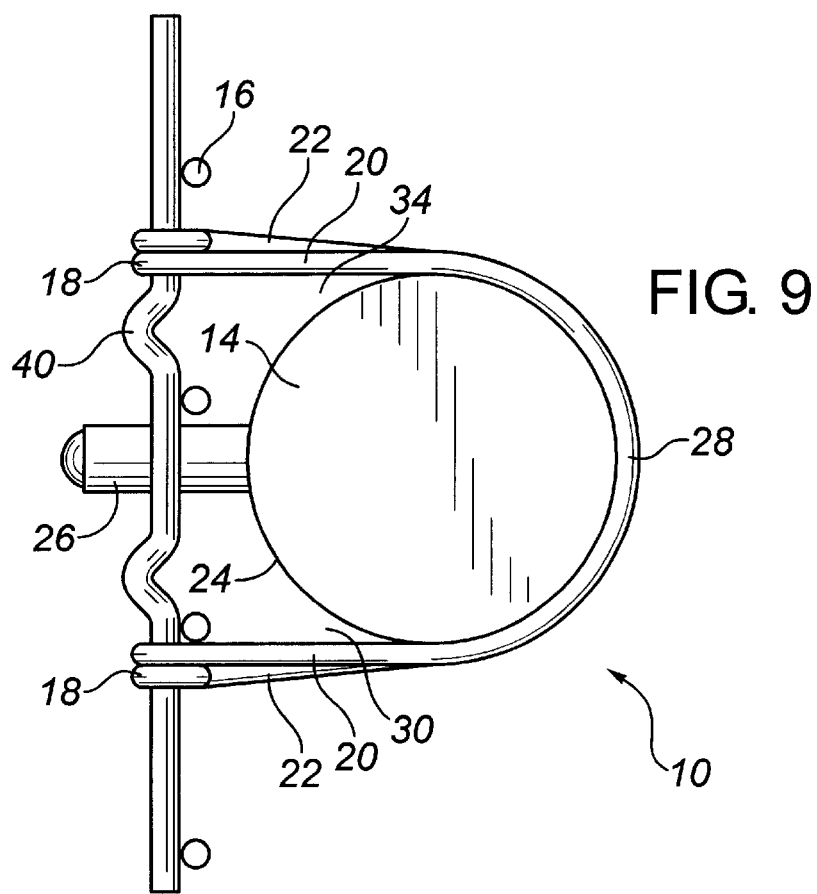
FIG. 9 is a top plan view of a supplemental mounting attachment for use with the apparatus illustrated in FIG. 4.

When bars 16 of the animal cage run vertically, instead of horizontally, following the illustrations FIGS. 2 through 5 and 7 through 8, will result in bottle 14 be oriented horizontally instead of vertically. Bottle can, however, be maintained in a vertical orientation if either apparatus 10 or apparatus 100 are used with an attachment rod. Referring to FIG. 9, apparatus 10 is shown installed in a cage having vertical bars 16. In order to do so, attachment rod 38 engages vertical bars 16 and is inserted axially through each of loops 18 of spring 12. Spring 12 is then held in position against vertical bars 16 by attachment rod 38. Most cages with vertical bars have one or two horizontal bars for purposes of reinforcement. The horizontal bars assist in preventing attachment rod 38 from sliding down vertical bars 16. It is preferred that attachment rod 38 have projecting stops 40, that prevent attachment rod 38 from inadvertently being dislodged when the cage is moved.

Figure 10:
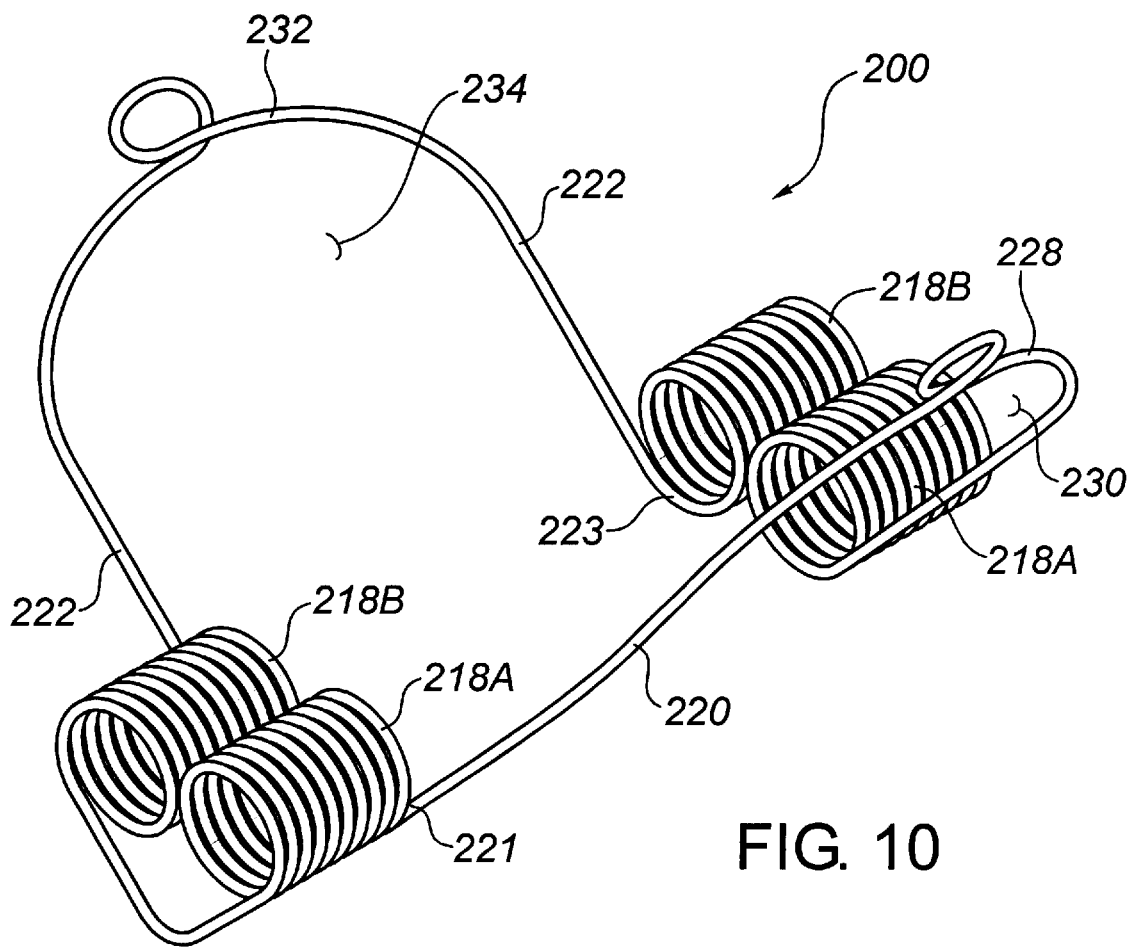
FIG. 10 is a perspective view of a spring configuration developed for use with the present invention.

Referring to FIG. 10 a special configuration of spring, generally indicated by reference numeral 200, is illustrated. As the size and weight of the bottle to be held is increased, greater spring tension is required to hold the bottle in position. Spring tension is, in turn, tied to the number of coils that the spring has. As the invention was developed to hold larger size bottles, it was discovered that a spring with the number of coils to provide the required spring tension to hold the larger bottle did not always fit through the bars of the cage. It was also discovered that larger coils changed the spacing of the arms, as one pair of arms extended from an outside edge of the coils and the other pair of arms extended from an inside edge of the coils. To address these problems spring 200 was developed. The basic configuration of spring 200 is the same as that of spring 12. Spring 200 has a first pair of spaced outwardly protruding arms 220 and a second pair of spaced outwardly protruding arms 222. First pair of arms 220 have a first connecting member 228 extending inbetween. First pair of arms 220 and first connecting member 228 define a first bottle receiving space 230. Second pair of spaced outwardly protruding arms 222 have a second connecting member 232 extending inbetween. Second pair of arms 222 and second connecting member 232 define a second bottle receiving space 234. However, due to the tension requirements, loops configured in the same manner as loops 18 would form too long of a coil to fit through the bars of the cage. Instead two groupings of loops are provided which form two pairs of discrete coils: first coil 218A and second coil 218B. This configuration enables spring tension to be increased while still enabling the resulting coils 218A and 218B to fit between the bars of the cage. By having first pair of arms 220 extend from inside edge 221 of first coil 218A and second pair of arms 222 extend from inside edge 223 of second coil 218B, first pair of arms 220 and second pair of arms 222 can be maintained more closely spaced.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A method for securing a bottle to a pet cage, comprising the steps of:

providing a spring having a first pair of arms protruding outwardly from a pair of spaced loops, the first pair of protruding arms having a first connecting member extending inbetween, the first pair of arms and the first connecting member defining a first bottle receiving space and a second pair of spaced arms protruding outwardly from the pair of spaced loops, the second pair of arms having a second connecting member extending inbetween, the second pair of arms and the second connecting member defining a second bottle receiving space;

providing a bottle adapted to fit within and extend between the first bottle receiving space and the second bottle receiving space;

compressing the first pair and the second pair of arms of the spring and inserting the first pair and second pair of arms between bars of a pet cage so that at least a portion of the loop is positioned on one side of the bars and the first pair and the second pair of arms is positioned on an opposite side of the bars; and inserting the bottle into the first bottle receiving space and the second bottle receiving space and permitting the biasing force of the loops acting through the first pair of arms and the second pair of arms upon the first connecting member and the second connecting member to force the bottle securely against the bars.

2. An apparatus for securing a bottle to a pet cage, comprising, in combination:

a pet cage having a plurality of bars;

a spring having a first pair of arms protruding outwardly from a pair of spaced loops, the first pair of protruding arms having a first connecting member extending inbetween, the first pair of arms and the first connecting member defining a first bottle receiving space and a second pair of spaced arms protruding outwardly from the pair of spaced loops, the second pair of arms having a second connecting member extending inbetween, the second pair of arms and the second connecting member defining a second bottle receiving space;

the first pair and the second pair of arms of the spring extending between the bars of the pet cage so that the loop is positioned on one side of the bars and the first pair and the second pair of arms is positioned on an opposite side of the bars; and a bottle positioned in the first bottle receiving space and the second bottle receiving space with the biasing force of the loop acting upon the first connecting member and the second connecting member to hold the bottle securely in position against the bars.

3. The apparatus as defined in claim 2, wherein each of the first connecting member and the second connecting member have projecting gripping portions whereby the spring is manually compressed.

4. The apparatus as defined in claim 2, wherein the apparatus further includes an attachment rod adapted for insertion axially through the loops of the spring.

5. The apparatus as defined in claim 2, wherein the spring has at least two pairs of discrete coils.

6. The apparatus as defined in claim 5, wherein the spring has a first pair of coils and a second pair of coils, the first pair of arms extending from an inside edge of the first pair of coils and the second pair of arms extending from an inside edge of the second pair of coils.

* * * * *